(12) United States Patent
Evans, V et al.

(10) Patent No.: US 10,986,255 B2
(45) Date of Patent: *Apr. 20, 2021

(54) INCREASING DISPLAY SIZE BY PLACING OPTICAL SENSORS BENEATH THE DISPLAY OF AN ELECTRONIC DEVICE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,727

(22) Filed: Jun. 24, 2019

(65) Prior Publication Data
US 2019/0317635 A1    Oct. 17, 2019

Related U.S. Application Data

(63) Continuation of application No. 15/336,620, filed on Oct. 27, 2016, now Pat. No. 10,331,260.
(Continued)

(51) Int. Cl.
*H04N 5/225* (2006.01)
*H04M 1/02* (2006.01)
(Continued)

(52) U.S. Cl.
CPC .......... *H04N 5/2254* (2013.01); *G06F 1/1626* (2013.01); *G06F 1/1637* (2013.01);
(Continued)

(58) Field of Classification Search
CPC .... G06F 1/1605; G06F 1/1626; G06F 1/1637; G06F 1/1643; G06F 1/1686; G06F 3/041;
(Continued)

(56) References Cited

U.S. PATENT DOCUMENTS 4,928,301 A    5/1990  Smoot
5,466,926 A   11/1995  Sasano et al.
(Continued)

FOREIGN PATENT DOCUMENTS

CN    101048727 A    10/2007
CN    102379002 A     3/2012
(Continued)

*Primary Examiner* — Keith L Crawley
(74) *Attorney, Agent, or Firm* — Perkins Coie LLP

(57) ABSTRACT

Various embodiments concern sensors and other components that can be disposed beneath a variable transparency layer of a mobile device. By modifying how much voltage is applied to the variable transparency layer, a component, such as a camera, can be readily hidden when not in use. More specifically, the variable transparency layer may be substantially opaque when the camera is not in use and at least partially transparent when the camera is in use and ready to capture an image. The opacity level of the variable transparency layer can be modified by a voltage source that is electrically coupled to the variable transparency layer. The various levels of opacity could also enable the variable transparency layer to act as an electronic aperture for the camera.

7 Claims, 10 Drawing Sheets

Related U.S. Application Data

(60) Provisional application No. 62/249,130, filed on Oct. 30, 2015, provisional application No. 62/318,123, filed on Apr. 4, 2016.

(51) Int. Cl.
  *G06F 1/16* (2006.01)
  *G06F 3/041* (2006.01)

(52) U.S. Cl.
  CPC .......... *G06F 1/1643* (2013.01); *G06F 1/1686* (2013.01); *G06F 3/041* (2013.01); *G06F 3/0412* (2013.01); *H04M 1/0264* (2013.01)

(58) Field of Classification Search
  CPC .... G06F 3/0412; G06F 3/0416; G06F 3/0304; G06F 2203/04106; H04N 5/2254; H04N 5/2257; H04N 7/142; H04N 2007/145; G02F 1/13338; G02F 1/1334; G02F 2001/133388; G02B 13/0075; G03B 17/00; G09G 3/38; G09G 2360/14; G09G 2360/141; G09G 2360/144; H04M 1/0264; H04M 2250/52
  See application file for complete search history.

(56) References Cited

U.S. PATENT DOCUMENTS

| | | | |
|---|---|---|---|
| 5,828,406 A | 10/1998 | Parulski et al. | |
| 6,107,618 A | 8/2000 | Fossum et al. | |
| 6,627,907 B1 | 9/2003 | Cole et al. | |
| 6,867,821 B2 | 3/2005 | De Schipper | |
| 6,876,143 B2 | 4/2005 | Daniels | |
| 6,885,157 B1 | 4/2005 | Cok et al. | |
| 6,992,718 B1 | 1/2006 | Takahara | |
| 7,034,866 B1 | 4/2006 | Colmenarez et al. | |
| 7,106,392 B2 | 9/2006 | You | |
| 7,130,011 B2 | 10/2006 | Hsieh et al. | |
| 7,697,053 B2 | 4/2010 | Kurtz et al. | |
| 7,795,842 B2 | 9/2010 | Sherman et al. | |
| 8,103,085 B1 | 1/2012 | Zadeh | |
| 8,576,325 B2 | 11/2013 | Dudek et al. | |
| 8,867,015 B2 | 10/2014 | Posner et al. | |
| 9,057,931 B1 | 6/2015 | Baldwin | |
| 9,204,089 B2 | 12/2015 | Nagano et al. | |
| 9,361,851 B1* | 6/2016 | Basehore | G09G 3/38 |
| 9,767,728 B2 | 9/2017 | Evans et al. | |
| 9,843,736 B2 | 12/2017 | Evans et al. | |
| 10,331,260 B2* | 6/2019 | Evans, V | H04N 5/2254 |
| 2002/0089467 A1 | 7/2002 | Hara | |
| 2003/0137712 A1 | 7/2003 | Westfall et al. | |
| 2004/0212555 A1 | 10/2004 | Falco | |
| 2004/0257473 A1 | 12/2004 | Miyagawa | |
| 2006/0136846 A1 | 6/2006 | Im et al. | |
| 2006/0146008 A1 | 7/2006 | Johnson et al. | |
| 2007/0002130 A1 | 1/2007 | Hartkop | |
| 2007/0081094 A1 | 4/2007 | Biudad et al. | |
| 2007/0109239 A1 | 5/2007 | den Boer et al. | |
| 2007/0153119 A1* | 7/2007 | Bilbrey | G06F 1/1605 348/373 |
| 2007/0247439 A1 | 10/2007 | Daniel et al. | |
| 2008/0068484 A1 | 3/2008 | Nam | |
| 2008/0080850 A1* | 4/2008 | Amirzadeh | G03B 15/03 396/155 |
| 2008/0106628 A1 | 5/2008 | Cok et al. | |
| 2008/0106629 A1 | 5/2008 | Kurtz et al. | |
| 2008/0142599 A1 | 6/2008 | Benillouche et al. | |
| 2008/0165267 A1 | 7/2008 | Cok | |
| 2008/0292144 A1 | 11/2008 | Kim | |
| 2008/0304819 A1* | 12/2008 | Tolbert | G03B 17/18 396/448 |
| 2009/0102763 A1* | 4/2009 | Border | H04N 7/144 345/87 |
| 2009/0121619 A1 | 5/2009 | Rajan et al. | |
| 2009/0153652 A1 | 6/2009 | Barenbrug | |
| 2009/0322706 A1 | 12/2009 | Austin | |
| 2010/0044121 A1 | 2/2010 | Simon et al. | |
| 2010/0060552 A1 | 3/2010 | Watanabe et al. | |
| 2010/0073518 A1 | 3/2010 | Yeh | |
| 2010/0117949 A1 | 5/2010 | Lai et al. | |
| 2010/0118179 A1 | 5/2010 | Ciudad et al. | |
| 2010/0177179 A1 | 7/2010 | Behm et al. | |
| 2010/0182446 A1 | 7/2010 | Matsubayashi | |
| 2011/0050657 A1 | 3/2011 | Yamada | |
| 2011/0122554 A1* | 5/2011 | Ramrattan | G03B 17/00 361/679.01 |
| 2011/0164047 A1 | 7/2011 | Pance | |
| 2011/0248155 A1 | 10/2011 | Chen | |
| 2011/0279689 A1* | 11/2011 | Maglaque | H04N 5/2253 348/207.1 |
| 2011/0285934 A1 | 11/2011 | Watanabe | |
| 2011/0310085 A1 | 12/2011 | Mimura et al. | |
| 2012/0068913 A1 | 3/2012 | Bar-Zeev et al. | |
| 2012/0074227 A1 | 3/2012 | Ferren et al. | |
| 2012/0105400 A1* | 5/2012 | Mathew | H04N 5/2251 345/207 |
| 2012/0287327 A1 | 11/2012 | Border et al. | |
| 2013/0135268 A1 | 5/2013 | Kanade et al. | |
| 2013/0135328 A1* | 5/2013 | Rappoport | G06F 3/0481 345/522 |
| 2013/0147764 A1 | 6/2013 | Chaji et al. | |
| 2013/0182062 A1 | 7/2013 | Son et al. | |
| 2013/0207896 A1 | 8/2013 | Robinson et al. | |
| 2013/0221856 A1 | 8/2013 | Soto | |
| 2013/0242479 A1 | 9/2013 | Yoo et al. | |
| 2013/0251215 A1 | 9/2013 | Coons | |
| 2013/0278516 A1 | 10/2013 | Nagata et al. | |
| 2013/0286152 A1 | 10/2013 | Hojer | |
| 2013/0321686 A1 | 12/2013 | Tan et al. | |
| 2013/0322752 A1 | 12/2013 | Lim et al. | |
| 2014/0036168 A1 | 2/2014 | Ludwig Lester F | |
| 2014/0063049 A1* | 3/2014 | Armstrong-Muntner | G03B 9/00 345/619 |
| 2014/0192257 A1* | 7/2014 | Gleason | G02F 1/153 348/363 |
| 2014/0208417 A1 | 7/2014 | Robison | |
| 2014/0232956 A1 | 8/2014 | Dwon et al. | |
| 2014/0253775 A1 | 9/2014 | Kim | |
| 2014/0267850 A1 | 9/2014 | Li et al. | |
| 2014/0267874 A1* | 9/2014 | Ratcliff | H04N 5/2254 348/335 |
| 2014/0289668 A1* | 9/2014 | Mavrody | G06F 3/04886 715/781 |
| 2015/0035936 A1 | 2/2015 | Robinson et al. | |
| 2015/0049165 A1 | 2/2015 | Choi | |
| 2015/0062052 A1 | 3/2015 | Bernstein et al. | |
| 2015/0192835 A1* | 7/2015 | Kim | G09G 3/3208 345/589 |
| 2015/0212583 A1 | 7/2015 | Shen et al. | |
| 2015/0271392 A1 | 9/2015 | Musgrave et al. | |
| 2015/0279020 A1 | 10/2015 | Gupta et al. | |
| 2016/0041447 A1* | 2/2016 | Yamamoto | G09G 3/38 359/275 |
| 2016/0161664 A1* | 6/2016 | Ishida | G02B 6/0045 359/230 |
| 2016/0180837 A1 | 6/2016 | Gustaysson et al. | |
| 2016/0206207 A1 | 7/2016 | Avila et al. | |
| 2016/0266672 A1* | 9/2016 | Inagaki | G09F 9/30 |
| 2016/0349590 A1* | 12/2016 | Ohshima | G02F 1/163 |
| 2016/0377949 A1* | 12/2016 | Jack | G02F 1/163 359/275 |
| 2017/0084231 A1* | 3/2017 | Chew | G06F 1/1626 |
| 2017/0123452 A1 | 5/2017 | Evans et al. | |
| 2017/0123453 A1 | 5/2017 | Evans et al. | |
| 2017/0123454 A1 | 5/2017 | Evans et al. | |
| 2017/0124932 A1 | 5/2017 | Evans et al. | |
| 2017/0124933 A1 | 5/2017 | Evans et al. | |
| 2017/0124942 A1 | 5/2017 | Evans et al. | |
| 2017/0171448 A1 | 6/2017 | Evans et al. | |
| 2017/0289324 A1* | 10/2017 | Yeo | G03B 29/00 |

(56) References Cited

U.S. PATENT DOCUMENTS

2017/0330507 A1 11/2017 Evans et al.
2018/0013944 A1 1/2018 Evans et al.
2018/0107241 A1 4/2018 Evans et al.

FOREIGN PATENT DOCUMENTS

| CN | 106019671 A | 10/2016 |
|----|-------------|---------|
| TW | 445744 B | 7/2001 |
| TW | 201001364 A | 1/2010 |
| TW | 201207535 A | 2/2012 |
| TW | M480723 U | 6/2014 |
| TW | 201523460 A | 6/2015 |
| WO | 2015097490 A1 | 7/2015 |

\* cited by examiner

INCREASING DISPLAY SIZE BY PLACING OPTICAL SENSORS BENEATH THE DISPLAY OF AN ELECTRONIC DEVICE

CROSS-REFERENCE TO RELATED APPLICATIONS

This application is a continuation of U.S. patent application Ser. No. 15/336,620, filed Oct. 27, 2016, which claims priority to and the benefit of U.S. Provisional Application No. 62/249,130, filed on Oct. 30, 2015, and U.S. Provisional Application No. 62/318,123, filed on Apr. 4, 2016, each of which are incorporated herein by reference in their entirety.

RELATED FIELD

Various embodiments relate generally to optical sensors for user devices. More specifically, various embodiments relate to techniques for positioning an optical sensor under a substrate layer having modifiable transparency.

BACKGROUND

Many types of electronic devices exist today that utilize a user interface that is viewed on a display, such as a liquid crystal display. A user typically interacts with the user interface using an input device that is mechanically actuated (e.g., by buttons or keys) or electronically activated (e.g., using a touch-sensitive screen). The user may view content, such as text and graphics, on the display, and interact with the content using the input device. For instance, a user could choose to issue a command, make a selection, or move a cursor within the bounds of the user interface. Touch-sensitive displays are becoming an increasingly popular option for many electronic devices due to the improved marketability and ease of use of such displays.

Most electronic devices include one or more cameras for capturing images of the surrounding environment, such as a front-facing camera (i.e., a camera that faces the user) that allows the user to capture images or video while looking at the display. Front-facing cameras also enable users to participate in two-way video calls, such as Google Hangouts™, Apple FaceTime®, or Skype™.

Front-facing cameras and other features (e.g., the speaker) are conventionally offset from the display. But this limits how much area on the front of the electronic device (also referred to as the "face" of the electronic device) can be devoted to the display.

SUMMARY

Various techniques for positioning a sensor or other component beneath a segment of display having variable transparency are described herein. The variable transparency layers enable the sensors and/or components to be readily hidden when not in use. For example, a camera could be hidden under a substantially opaque segment of the display when not in use, and then exposed (e.g., by changing the opacity level of the segment) when the user intends to capture an image with the camera.

More specifically, the user device can include a variable transparency layer that is located below or in line with a protective substrate (e.g., glass, plastic, etc., or a composite thereof) with which a user interacts, and a voltage source (e.g., a battery) that is electrically coupled to the variable transparency layer. When the user device determines the user is likely to use the camera (e.g., by recognizing the user initiated an application program associated with the camera), the user device can prompt the voltage source to modify the voltage that is applied to the variable transparency layer, which causes the opacity level of the variable transparency layer to change.

In some embodiments, the voltage source increases the transparency of the variable transparency layer by continually applying a voltage to multiple sub-layers of the variable transparency layer. In other embodiments, the voltage source increases the transparency of the variable transparency layer by applying a single instance of voltage to one sub-layer of the variable transparency layer. Techniques are also described herein for modifying the opacity level of the variable transparency level after the user has captured an image using the camera. For example, voltage may be applied to different sub-layers of the variable transparency layer (or may cease to be applied at all) in order to make the variable transparency layer return to an opaque or translucent state.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
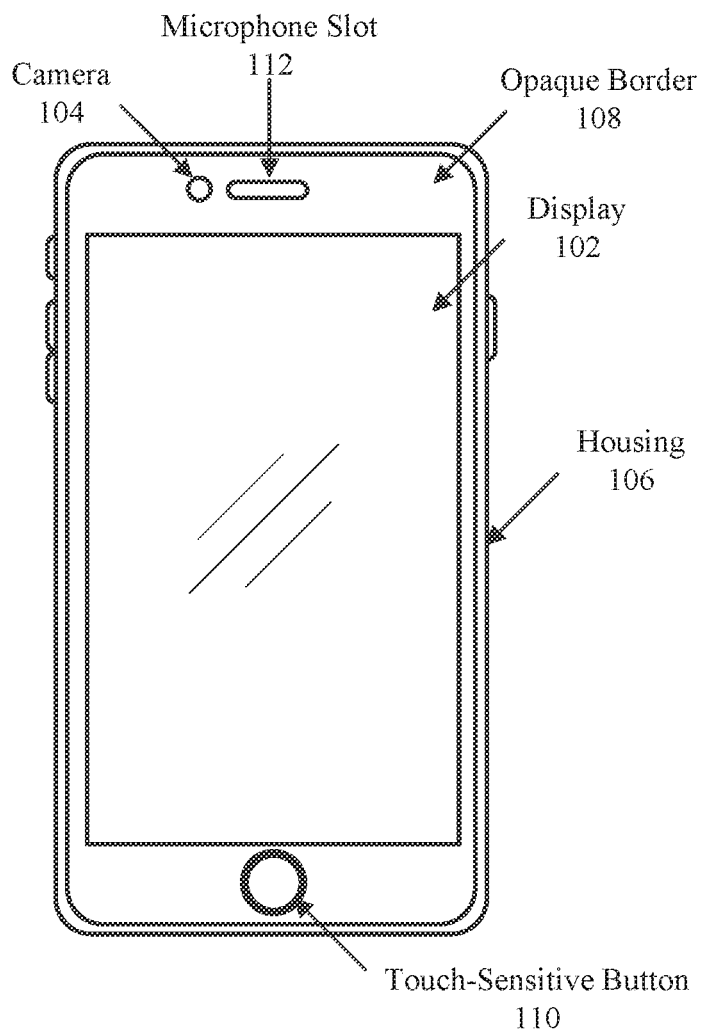
FIG. 1 depicts a user device that includes a display and a camera that is offset from the display.

Techniques for positioning an optical sensor of a user device below a layer that can be transparent in varying degrees (i.e., a "variable transparency layer") are described herein. Although the term "camera" is used throughout the Detailed Description for the purposes of illustration, other sensors (e.g., proximity sensor, ambient light sensor) and components (e.g., light emitting diodes) could also be disposed below the same variable transparency layer or another variable transparency layer. The variable transparency layer allows the camera to be hidden from the user while not in use. For example, the variable transparency layer may be substantially opaque while the camera is inactive and at least partially transparent when the camera is active and ready to capture an image.

These techniques can be used with any electronic device having a camera and a display on which a user views content, such as computers, tablets, personal digital assistants (PDAs), mobile phones, gaming devices, music players, wearable electronic devices (e.g., watches), and other portable electronic devices.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for any one or more of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to the various embodiments given in this specification.

System Overview

FIG. 1 depicts a user device 100 that includes a display 102 and a front-facing camera 104 disposed within a housing 106. As noted above, the camera 104 on conventional user devices is offset from the display 102, which limits the size of the display 102. For example, the camera 104 may be located within an opaque border 108 that surrounds the display 102 and is not responsive to user interactions (i.e., is not touch sensitive). The opaque border 108 is often used to hide components (e.g., sensors, connectors, power supply) that reside within the user device 100.

The camera 104 is typically one of multiple cameras included in the user device 100. For example, the user device 100 may include a rear-facing camera that enables the user to simultaneously preview and capture images of objects residing behind the user device, and a front-facing camera that enables the user to capture images of objects residing in front of the user device. The rear-facing and front-facing cameras can be, and often are, different types of cameras and/or intended for different uses. For example, the cameras may be able to capture images having different resolutions or could be used with different lighting technologies (e.g., a stronger "flash" for the rear-facing camera, utilization of the display as a "flash" for the front-facing camera).

Other sensors and/or components may also limit the size of the display 102. For example, a touch-sensitive button 110 could be offset from the display 102 that enables the user to readily interact with content shown on the display 102. As another example, an ambient light sensor or a proximity sensor could be placed in or near a microphone slot 112 offset from the display 102. The microphone slot 112 is typically an opening in the protective substrate that enables audio waves to be projected by a microphone disposed within the housing 106 of the user device 100.

Figure 2A:
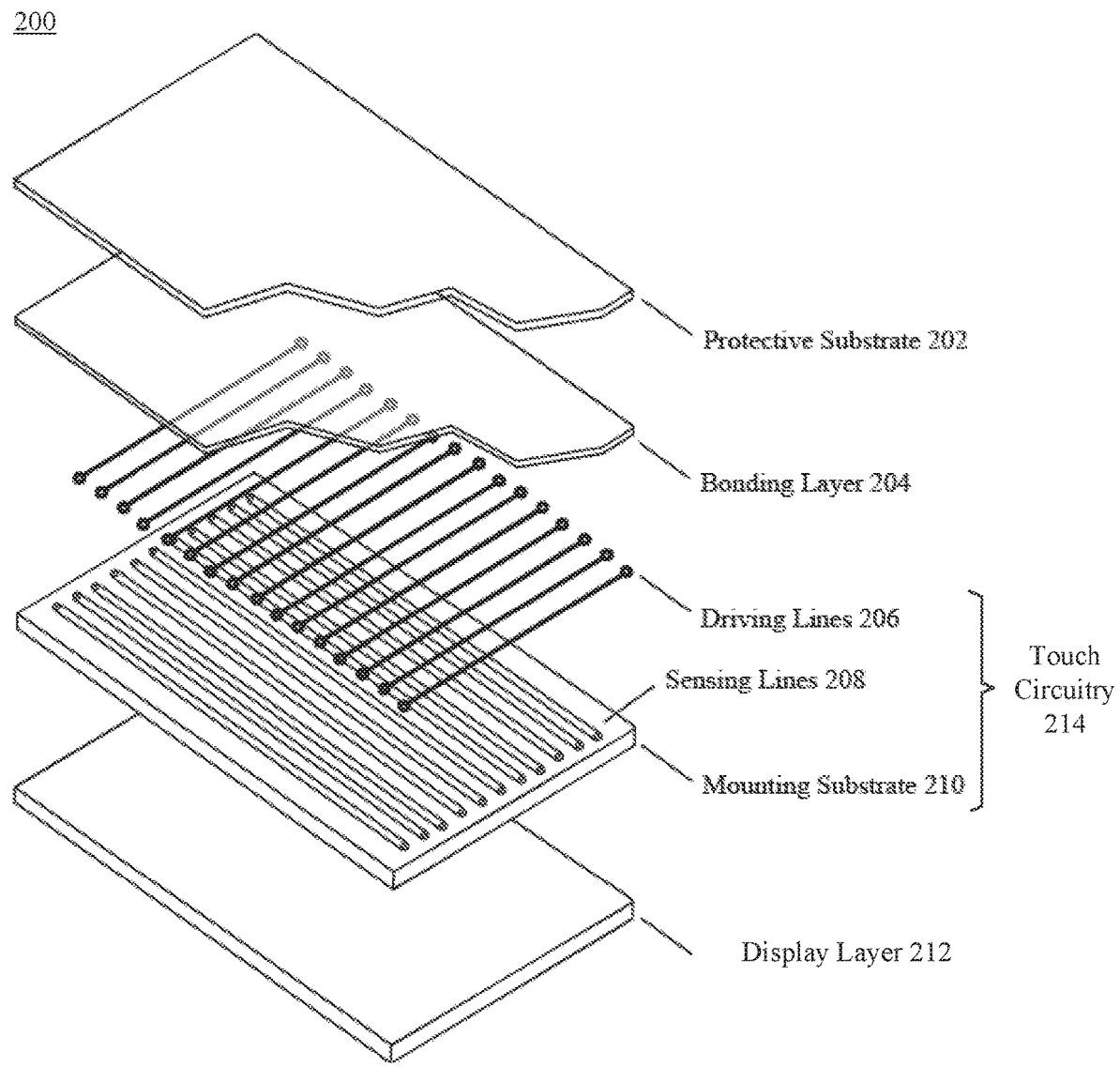
FIG. 2A is an exploded perspective view of a conventional display assembly for a user device.
Figure 2B:
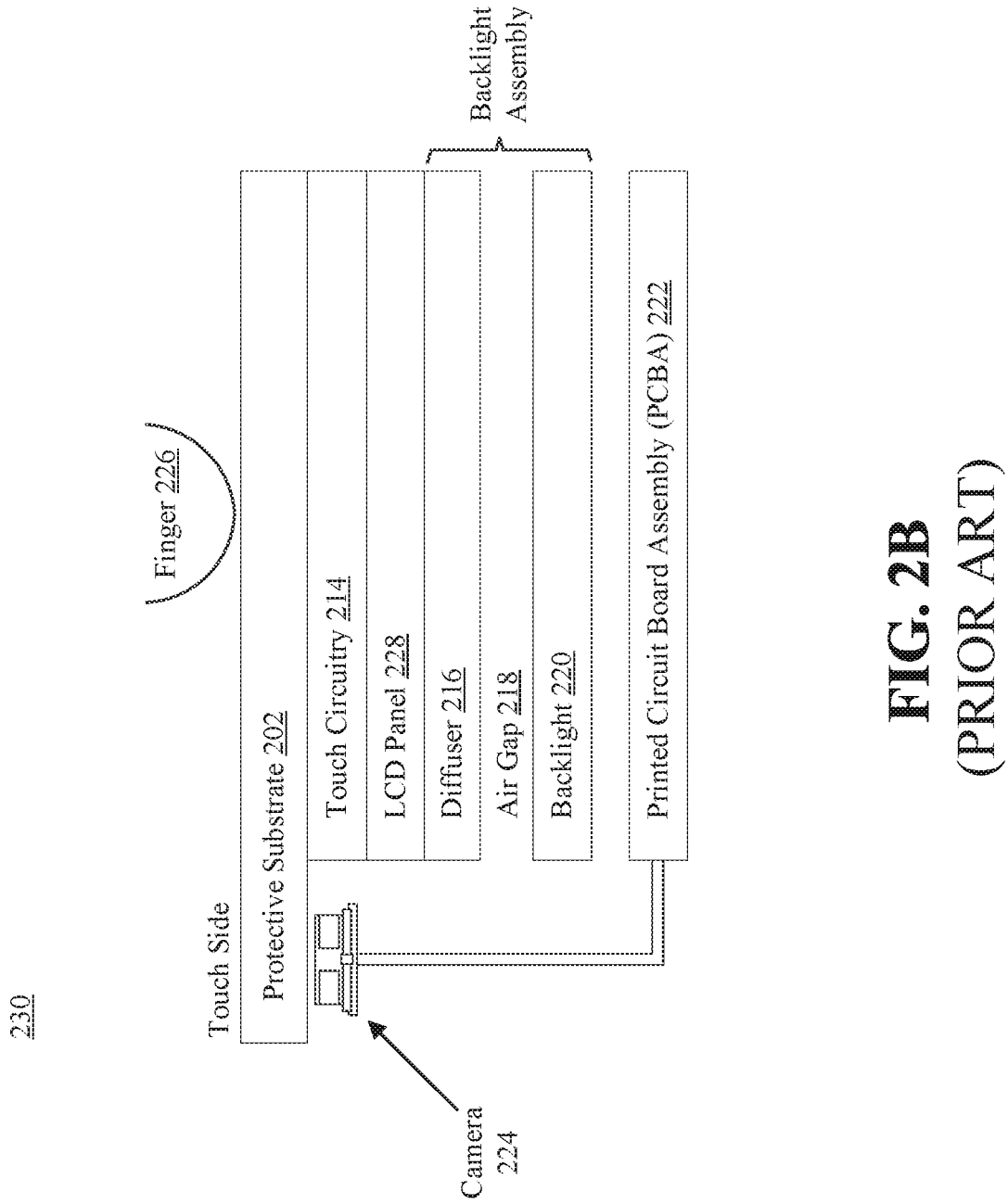
FIG. 2B is a side view of a user device that illustrates how the camera is conventionally offset from the display assembly.

FIG. 2A is an exploded perspective view of a conventional display assembly 200 for a user device. FIG. 2B, meanwhile, is a side view of a user device 230 that illustrates how the camera 224 is conventionally offset from the display assembly. The display assembly 200 can include a protective substrate 202, an optically-clear bonding layer 204, driving lines 204 and sensing lines 208 disposed on a mounting substrate 210, and a display layer 212. Various embodiments can include some or all of these layers, as well as other layers (e.g., optically-clear adhesive layers).

The protective substrate 202 enables a user to interact with (e.g., by making contact with an outer surface using a finger 226) the display assembly 200. The protective substrate 202 is preferably substantially or entirely transparent and can be composed of glass, plastic, or any other suitable material (e.g., crystallized aluminum oxide).

Together, the driving lines 206 and sensing lines 208 include multiple electrodes ("nodes") that create a coordinate grid for the display assembly 200. The coordinate grid may be used by a processor on a printed circuit board assembly (PCBA) 222 to determine the intent of a user interaction with the protective substrate 202. The driving lines 206 and/or sensing lines 208 can be mounted to or embedded within a transparent substrate 210, such as glass or plastic. The driving lines 206, sensing lines 208, and/or mounting substrate 210 are collectively referred to herein as "touch circuitry 214."

An optically-clear bonding layer 204 may be used to bind the protective substrate 202 to the touch circuitry 214, which generates signals responsive to a user interaction with the protective substrate 202. The bonding layer 204 can include an acrylic-based or silicon-based adhesive, as well as one or more layers of indium-tin-oxide (ITO). Moreover, the bonding layer 204 is preferably substantially or entirely transparent (e.g., greater than 99% light transmission) and may display good adhesion to a variety of substrates, including glass, polyethylene (PET), polycarbonate (PC), polymethyl methacrylate (PMMA), etc.

A display layer 212 is configured to display content with which the user may be able to interact. The display layer 212 could include, for example, a liquid crystal display (LCD) panel 228 and a backlight assembly (e.g., a diffuser 216 and a backlight 220) that is able to illuminate the LCD panel 228. Other display technologies could also be used, such as light emitting diodes (LEDs), organic light emitting diodes (OLED), electrophoretic/electronic ink ("e-ink"), etc. Air gaps may be present between or within some of these layers. For example, an air gap 218 may be present between the diffuser 216 and the backlight 220 in the backlight assembly.

As shown in FIG. 2B, a camera 224 disposed within the housing of the user device 230 is typically coupled to a PCBA 222 that includes one or more components (e.g., processors) that enable the user to capture images using the camera 224. Although the camera 224 may be located below the protective substrate 202, the camera 224 is offset from the display assembly 200.

Figure 3A:
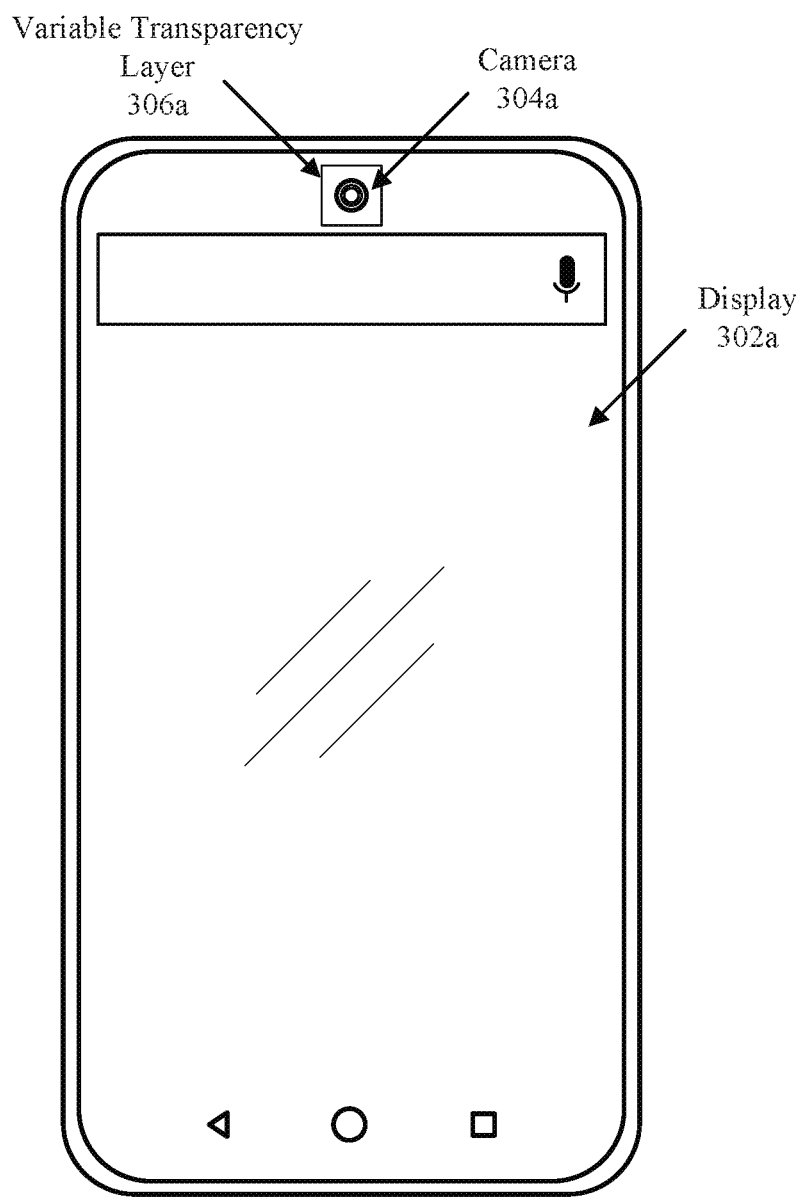
FIG. 3A depicts a user device that includes a camera set within the outermost bounds of the display and disposed under a layer having variable transparency.
Figure 3B:
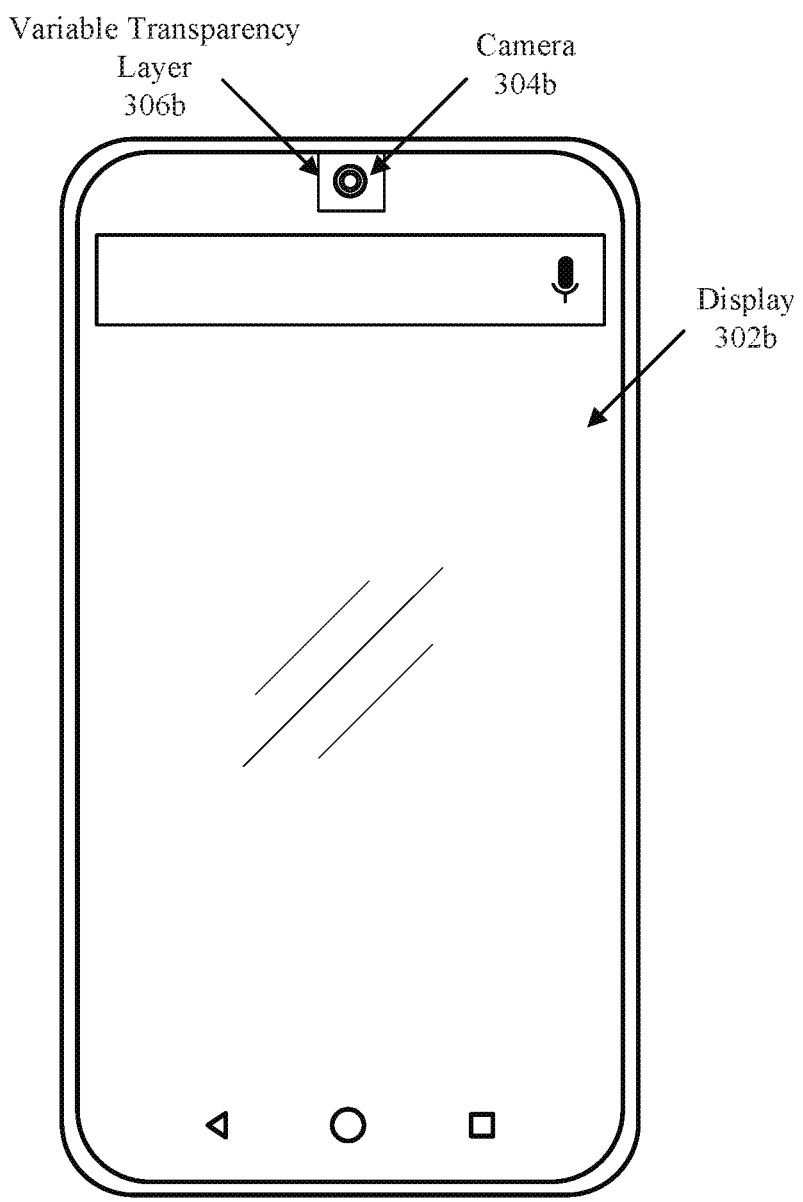
FIG. 3B depicts a user device that includes a display assembly that has been formed to accommodate a camera within the outermost bounds of the display.

FIGS. 3A-B depict user devices 300a-b that include cameras 304a-b set within the outer bounds of the display 302a-b and disposed under segments of the display having variable transparencies. Positioning a camera (e.g., camera 304a) directly beneath a variable transparency layer (e.g., variable transparency layer 306a) enables the camera to be hidden from view when not in use. For example, a segment of the display 302a-b surrounding the camera 304a-b may appear to be partially or entirely opaque when the camera 304a-b is inactive and partially or entirely transparent when the camera 304a-b is active and ready to capture an image.

Consequently, the camera may be completely hidden from view when the camera is inactive, and the user may only be able to see an opaque segment of the display (e.g., an opaque square in the case of FIG. 3A). This opaque segment may blend in with an opaque border if one is present or with content presented on the display 302a-b (e.g., as part of a dashboard along the upper edge of the display 302a-b).

Modifications could be made to the display assembly that enable the camera 304a-b and variable transparency layer 306a-b to be positioned within the bounds of the display 302a-b. For example, at least some layers in the display assembly (e.g., the active display panel and the touch circuitry) could have an opening through which the camera is able to see. The opening could be a geometric shape (e.g., a square as shown in FIG. 3A) that is completely surrounded by the display assembly or a notch in one of the sides of the display assembly (as shown in FIG. 3B). Consequently, various layers in the display assembly (e.g., display assembly 200 of FIG. 2A) could be designed to enable the camera 304a-b to sit within the outermost border of the display 302a-b.

Figure 4:
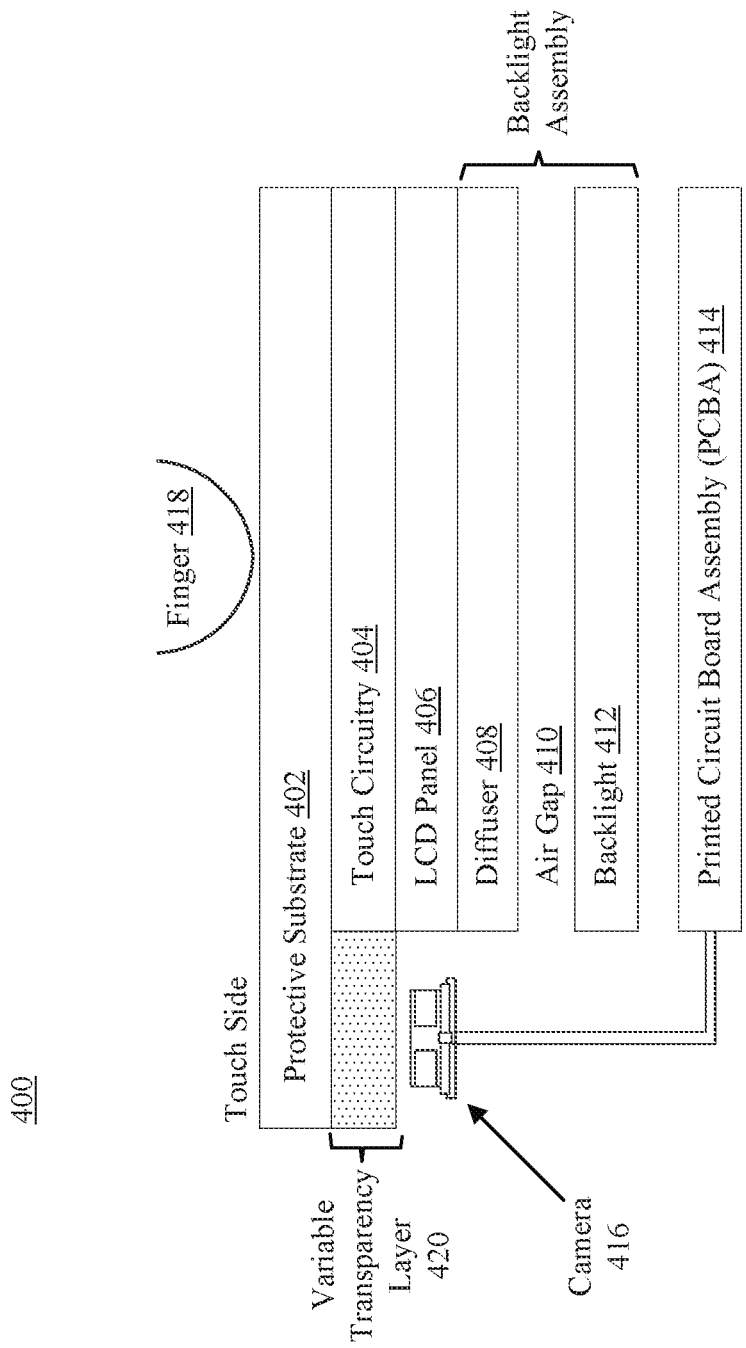
FIG. 4 is a side view of a user device that illustrates how a display assembly and a variable transparency layer can both be located below a protective substrate.

FIG. 4 is a side view of a user device 400 that illustrates how a display assembly and a variable transparency layer 420 can both be located below a protective substrate 402. The display assembly could also include touch circuitry 404, an LCD panel 406, and a backlight assembly that includes a diffuser 408, air gap 410, and/or backlight 412. Although the user device 400 of FIG. 4 includes an LCD panel 406 and backlight assembly, other display technologies could also be used.

Inclusion of the variable transparency layer 420 enables the camera 416 (or some other component) to be hidden when not in use. In some embodiments, the various opacity levels of the variable transparency layer 420 could also be used to filter images captured by the camera 416. For example, a user could adjust the total range, contrast, etc., of an image by modifying the opacity level of the variable transparency layer 420.

The display assembly can be arranged as would conventionally occur as shown in FIG. 1, or as described above with respect to FIGS. 3A-B. The variable transparency layer 420 can then be disposed between the inner side of the protective substrate 402 and the camera 416. That is, the camera 416 can be disposed directly beneath the variable transparency layer 420 whose opacity level varies in response to a voltage supplied by a voltage source (e.g., a battery). As further described below, the variable transparency layer 420 typically includes multiple layers, and the light transmission properties of at least one of these layers is configured to change when voltage, light, heat, etc., is applied. Thus, the variable transparency layer 420 may be able to change from opaque or translucent to substantially transparent in response to receiving an indication (e.g., via the protective substrate) that the user intends to capture an image using the camera 416.

In some embodiments, the user is able to prompt a change in the opacity level of the variable transparency layer 420 by interacting with the user device 400 (e.g., by interacting with the protective substrate 402 using a finger 418). For example, the user device 400 may include an application program that is associated with the camera 416. Upon determining the user has supplied user input requesting the application program be initiated (e.g., by tapping an icon corresponding to the application program), the user device 400 (and more specifically the PCBA 414) may initiate the application program and cause the voltage source to modify the voltage applied to the variable transparency layer 420 (e.g., by applying or discontinuing to apply a voltage). The voltage source could be a lithium-based battery, an alkaline-based battery, a lead-based battery, a nickel-cadmium battery, a nickel-metal-hydride battery, or any other suitable source of voltage.

Figure 5A:
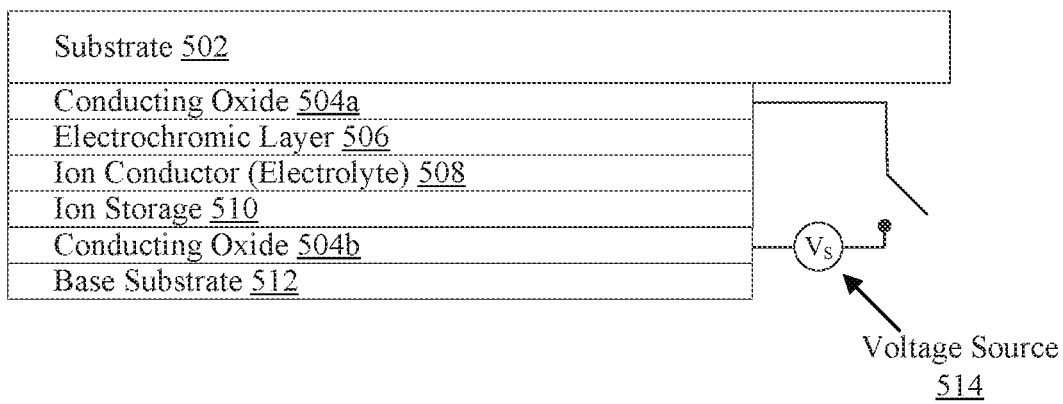
FIG. 5A is a side view of a variable transparency layer that modifies its opacity level via electrochromism.

FIG. 5A is a side view of a variable transparency layer 500 that is able to darken its appearance when a voltage is applied via electrochromism. Electrochromism enables some materials to reversibly change opacity by using bursts of voltage to cause electrochemical redox reactions in electrochromic materials. In such embodiments, the variable transparency layer 500 can include multiple layers that are disposed between a substrate 502 and a base substrate 512.

For example, the layers could be deposited on top of the substrate 502 by a sputtering process. The substrate 502 can be the protective substrate with which the user makes contact (e.g., protective substrate 202 of FIGS. 2A-B) or another distinct substrate located below the protective substrate. The substrate 502 and base substrate 512 are generally composed of an optically-clear material (e.g., glass, plastic).

The multiple layers can include a first conducting oxide layer 504a, an electrochromic layer 506 (e.g., tungsten oxide ($WO_3$)), an ion conductor layer 508, an ion storage layer 510 (e.g., lithium cobalt oxide ($LiCoO_2$)), and a second conducting oxide layer 504b. The conducting oxide layers 504a-b are thin films of optically transparent and electrically conductive materials, such as indium tin oxide (ITO). The conducting oxide layers 504a-b could also be composed of other transparency conductive oxides (TCOs), conductive polymers, metal grids, carbon nanotubes, graphene, ultrathin metal films, or some combination thereof. The ion conductor layer 508 can include a liquid electrolyte or a solid (e.g., inorganic or organic) electrolyte. A voltage source 514, which is coupled to the conducting oxide layers 504a-b, is able to selectively apply a voltage to either of the conducting oxide layers, which drives ions from the ion storage layer 510 into the electrochromic layer 506 and vice versa.

More specifically, when the voltage source 514 applies a voltage to the outermost conducting oxide 504a, ions move from the ion storage layer 510 to the electrochromic layer 506. This causes the variable transparency layer 500 to reflect light and appear at least partially opaque. When the voltage source 514 applies a voltage to the innermost conducting oxide 504b, the ions return to the ion storage layer 510 from the electrochromic layer 506. This enables the variable transparency layer 500 to reflect less light and appear at least partially transparent.

Conversely, an ion-soaked electrochromic layer 506 is able to reflect light that filters through the substrate 502, thereby enabling the variable transparency layer 500 to appear at least partially opaque. By passing low-voltage electrical charges across the variable transparency layer 500, the electrochromic layer 506 can be changed from substantially transparent to substantially opaque.

Only a single instance of voltage needs to be applied to modify the transparency of the variable transparency layer 500 in such embodiments. Thus, voltage need not be continually applied in order to maintain a particular level of transparency. The ions will remain in the electrochromic layer 506 and the variable transparency layer will remain at least partially opaque until the voltage it reversed, which causes the ions to move back into the ion storage layer 510.

The transparency level of the variable transparency layer 500 at any given point in time can be modified by supplying more or less voltage to the first or second conducting oxides 504a-b. For example, when a high voltage is applied to the outermost conducting oxide 504a, more ions migrate into the electrochromic layer 506 and the variable transparency layer 500 appears to be more opaque. As another example, a lower voltage can be applied to the outermost conducting oxide 504a if the variable transparency layer 500 needs to be more transparent.

Figure 5B:
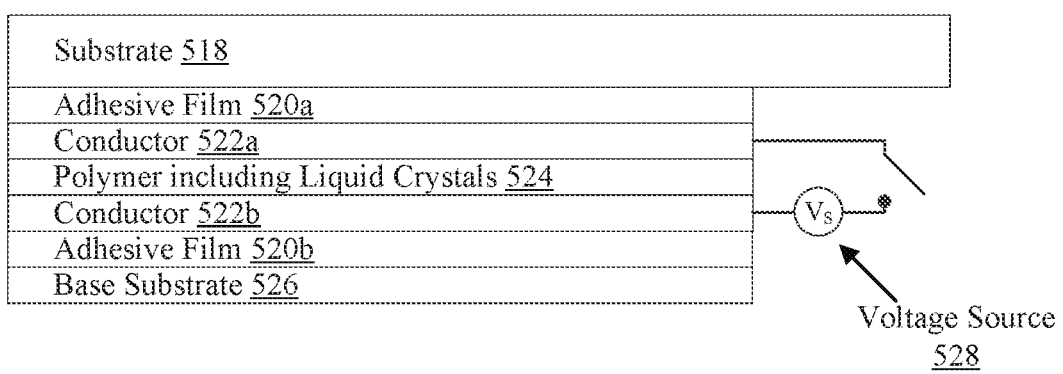
FIG. 5B is a side view of a variable transparency layer that utilizes polymer dispersed liquid crystal (PDLC) technology.

FIG. 5B is a side view of a variable transparency layer 516 that varies its opacity level when a voltage is applied via polymer dispersed liquid crystal (PDLC) technology. Voltage is used to change the position and orientation of liquid crystals disposed within a polymer matrix 524 in order to allow more or less light to pass through the variable transparency layer 516.

In such embodiments, the variable transparency layer 516 can include electrically-conductive coatings 522a-b (e.g., polyethylene terephthalate (PET)) on each side of a polymer matrix 524 that includes randomly-arranged liquid crystals. Adhesive films 520a-b may be used to bond the conductive coatings 522a-b to optically-clear substrates 518, 526. The optically-clear substrates could be composed of glass, plastic, or any other suitable material (e.g., crystallized aluminum oxide). The outermost substrate 518 can be the protective substrate with which the user makes contact (e.g., protective substrate 202 of FIGS. 2A-B) or another distinct substrate located below the protective substrate.

Electrical wiring can couple the conductive coatings 522a-b to a voltage source 528. When a voltage is applied to the conductive coatings 522a-b, the liquid crystals within the polymer matrix 524 become aligned and the variable transparency layer 516 becomes substantially or entirely transparent. However, when the voltage source 528 ceases to apply the voltage, the liquid crystals scatter and the variable transparency layer 516 appears substantially opaque or translucent.

Unlike the electrochromic techniques described above, a variable transparency layer 516 that utilizes PDLC technology will only appear transparency so long as voltage is applied to the conductive coatings 522a-b by the voltage source 528. Thus, the voltage source 528 must continually provide voltage in order to maintain transparency. This may be preferred in embodiments where the variable transparency layer 516 is intended to remain opaque or translucent for long durations of time.

Electrochromic and PDLC techniques have been selected and described herein for the purposes of illustration. Other technologies that enable the modification of light transmission properties could also be used to achieve the same (or similar) effects, such as photochromic, thermochromic, suspended particle, and micro-blind techniques.

Figure 6:
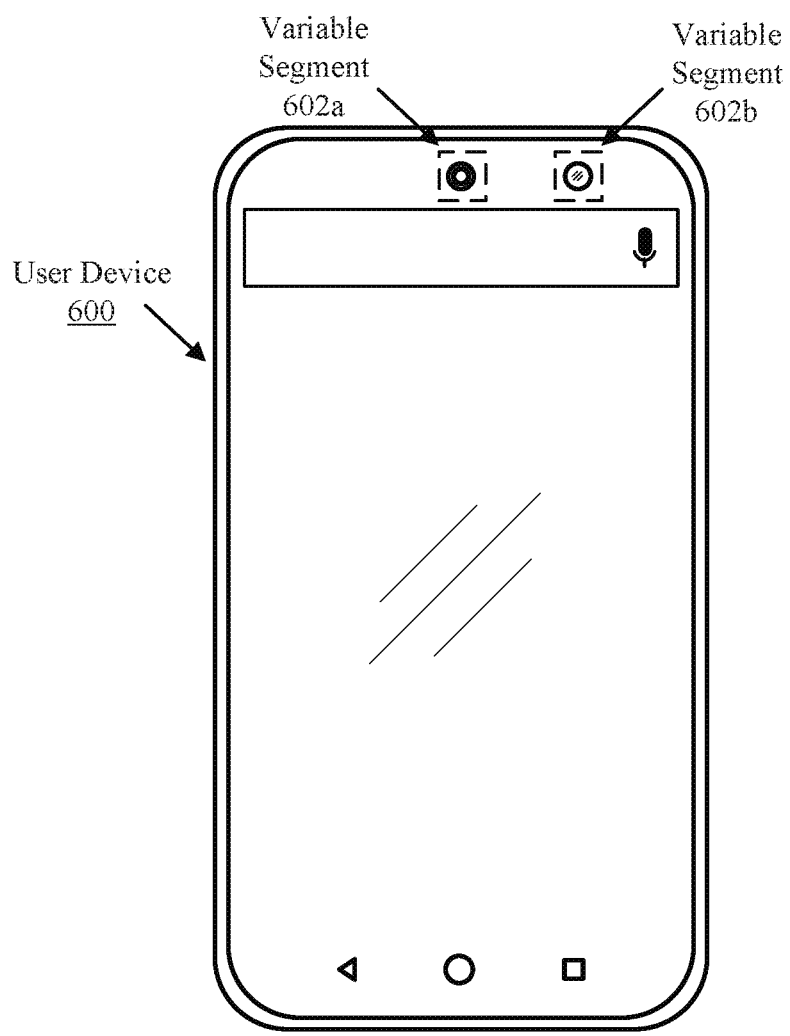
FIG. 6 depicts how the display of the user device can include one or more segments having variable transparency.

As shown in FIG. 6, the display of a user device 600 can include one or more segments 602a-b having variable transparency. In some embodiments, the segment(s) 602a-b are disposed over certain areas of the display that include component(s) that are desirable to be hidden from the user. For example, variable segment 602a may be disposed above a camera, while variable segment 602b may be disposed over a lighting feature (e.g., a light emitting diode or light pipe), an ambient light sensor, a proximity sensor, etc.

The segment(s) 602a-b may be individually controllable by a processor housed within the user device. That is, the processor may be able to make one segment (e.g., segment 602a) substantially transparent, while the other segment (e.g., segment 602b) remain opaque or translucent. The opacity level of each segment 602a-b could also be specified by a user of the user device 600 (e.g., via an application program associated with the corresponding components). For example, the user might specify a first opacity level for a variable segment 602a disposed over a camera and a second opacity level for a variable segment 602b disposed over a lighting feature.

Figure 7:
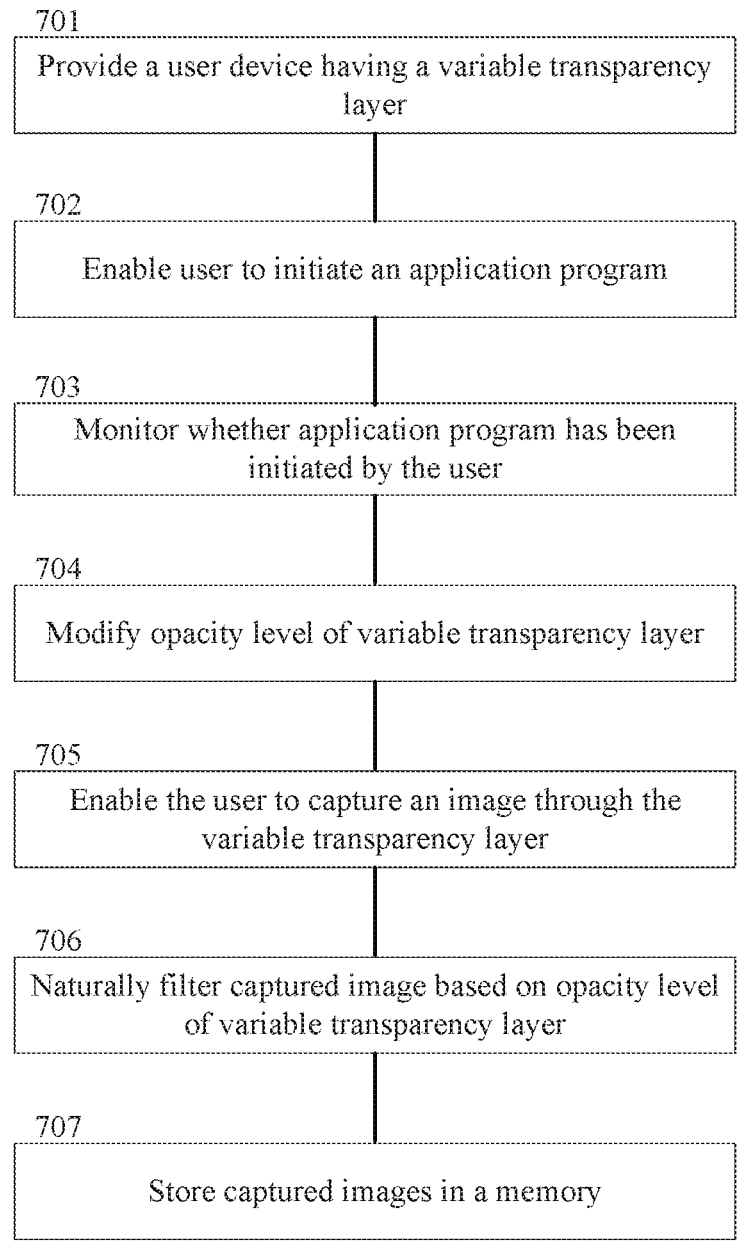
FIG. 7 depicts a process for modifying the transparency of a variable transparency layer of a user device.

FIG. 7 depicts a process 700 for modifying the transparency of a variable transparency layer of a user device. The user device may be a smartphone, tablet, a personal computer, or any other electronic device having a feature that is desirable to hide from a user when not in use.

A user device is initially provided (e.g., to a user) that can include a protective substrate, a display assembly, a processor, a voltage source, and a variable transparency layer (step 701). The variable transparency layer can be located below or in line with the protective substrate. That is, the variable transparency layer may be disposed directly underneath and adjacent to the protective substrate as shown in FIG. 4, or the variable transparency layer may be integrated into the protective substrate (e.g., during the manufacturing process). The protective substrate could be glass, plastic, or any other suitable material (e.g., crystallized aluminum oxide). The protective substrate includes two sides: an outward-facing side with which a user is able to make contact, and an inward-facing side that is directly adjacent to another layer of the display assembly (e.g., touch circuitry or the variable transparency layer).

In some embodiments, the user is able to initiate an application program that is associated with a camera and is executed by the processor (step 702). The user device can continually monitor whether the application program has been initiated by the user (step 703), and, upon determining the application program has been initiated, the user device can modify the opacity level of the variable transparency layer (step 704). As further described above, this can be accomplished by applying a voltage or by ceasing to apply a voltage to the variable transparency layer.

In some embodiments, the amount of voltage applied to the variable transparency layer is based at least in part on user input received at the application program. For example, the user may specify a camera setting (e.g., high contrast) or environmental information (e.g., high light scene) that prompts the user device to modify the opacity level of the variable transparency layer. As another example, the user device could be configured to automatically modify the opacity level of the variable transparency layer based on other information gathered by the camera, ambient light sensor, proximity sensor, etc.

When the variable transparency layer becomes less than substantially opaque, the user device can allow the user to capture an image (step 705). The user device may capture the image upon receiving user input at the application program (e.g., a tap of a digital icon) or at the user device (e.g., a press of a button). The amount of voltage applied to the variable transparency layer may cause the variable transparency layer to be less than fully transparent. For example, application of a first voltage may cause the variable transparency layer to be substantially or entirely transparent (e.g., 99% transparency), while application of a second lesser voltage may cause the variable transparency layer to be more opaque and less transparent (e.g., 75% transparency). Consequently, the variable transparency layer could be used as a natural filter for images captured by the camera (step 706). The variable transparency layer acts as a "natural filter" because it filters light prior to the image being captured by the camera, rather than serving as a post-capture filter. Images captured by the camera can be stored in a memory that is accessible to the user device (step 707). The memory could be housed within the user device or may be remotely accessible by the user device across a network (e.g., as part of a cloud-storage solution).

Unless contrary to physical possibility, it is envisioned that the steps described above may be performed in various sequences and combinations. For instance, a user device could automatically modify the opacity level of the variable transparency layer before the user initiates the application program. Other steps could also be included in some embodiments. For example, the user may be able to apply post-capture filters to an image in addition to the filtering provided by the variable transparency layer.

Processing System

Figure 8:
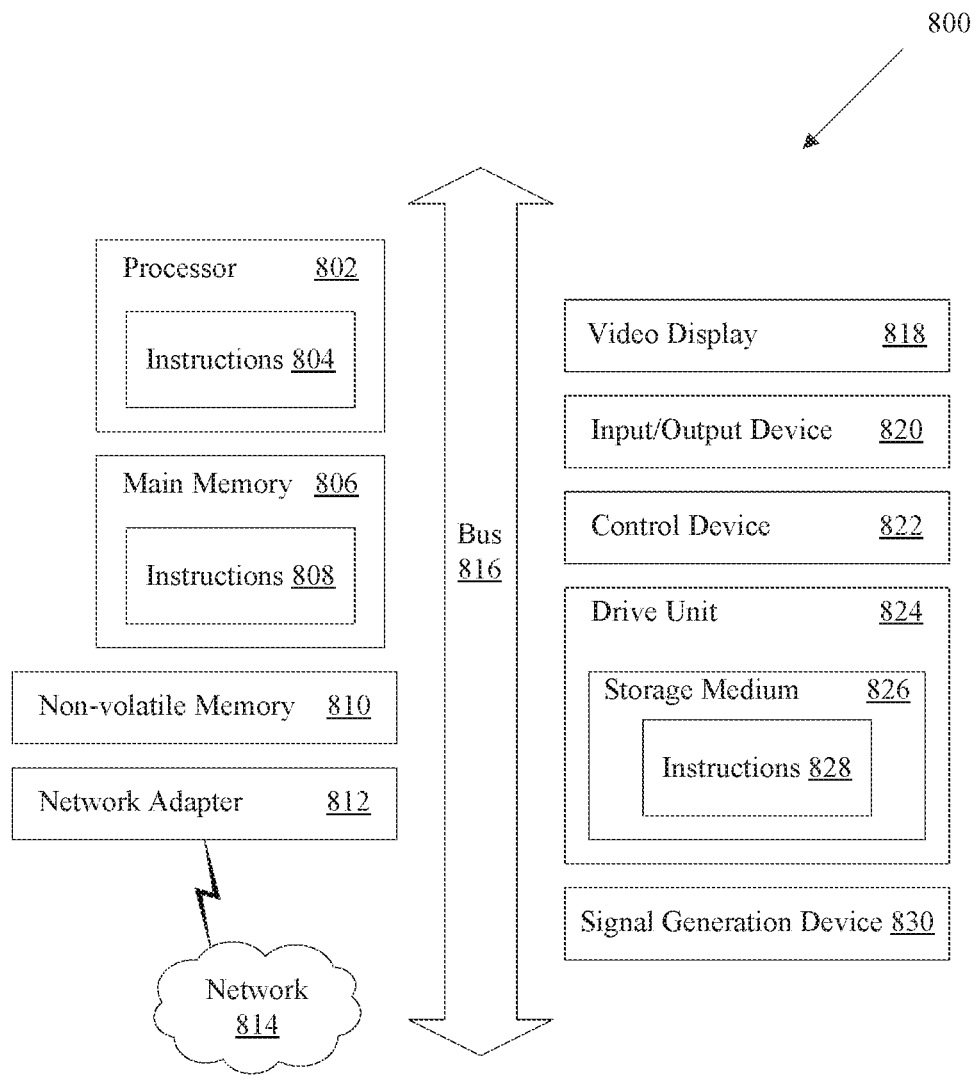
FIG. 8 is a block diagram illustrating an example of a processing system in which at least some operations described herein can be implemented.

FIG. 8 is a block diagram illustrating an example of a processing system 800 in which at least some operations described herein can be implemented. The computing system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as part of a user device (e.g., user device 300a-b of FIGS. 3A-B), although the processing system 800 may be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer (PC), a tablet PC, a laptop computer, a personal digital assistant (PDA), a cellular telephone, an iPhone®, an iPad®, a Blackberry®, a processor, a telephone, a web appliance, a network router, switch or bridge, a console, a hand-held console, a gaming device, a music player, or any portable, device or any machine capable of executing a set of instructions (sequential or otherwise) that specify actions to be taken by the processing system.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An electronic device comprising:
   a continuous display extending substantially evenly to all borders of a face of the electronic device and occupying at least ninety percent of an area of the face of the electronic device, a portion of said display comprising:
   a first variable transparency region defining a variably light transmissive aperture through said display,
   wherein the first variable transparency region is operable from transparent to opaque in response to a signal applied thereto;
   a touch circuitry configured to generate signals responsive to a user interaction;
   wherein the first variable transparency region is arranged directly adjacent in a co-planar relationship only with the touch circuitry;
   a sensor disposed directly beneath the first variable transparency region;
   wherein light is received by the sensor through said display when said first variable transparency region is operated to be transparent; and
   wherein said first variable transparency region is opaque when said first variable transparency region is operated to be opaque.

2. The electronic device of claim 1, further comprising:
   a portion of said display comprising a second variable transparency region defining a second variably light transmissive aperture through said display, wherein the second variable transparency region is operable from transparent to opaque in response to a second signal applied thereto; and
   a light emitting device disposed directly beneath the second variable transparency region;
   wherein light is transmitted by the light emitting device through said display when said first variable transparency region is operated to be transparent; and
   wherein said second variable transparency region is opaque when said first variable transparency region is operated to be opaque.

3. The electronic device of claim 2, said first and second variable transparency regions further comprising:
   a first conducting oxide layer;
   an electrochromic layer below the first conducting oxide layer;
   an electrolyte layer below the electrochromic layer;
   an ion storage layer below the electrolyte layer; and a second conducting oxide layer below the ion storage layer;

wherein the first and second conducting oxide layers are electrically coupled to a voltage source;

wherein application of a voltage to the second conducting oxide layer causes ions to be transferred from the electrochromic layer to the ion storage layer, which causes a corresponding variable transparency segment to become more transparent.

4. The electronic device of claim 2, said first and second variable transparency regions further comprising:

a first conductor layer;

a polymer layer below the first conductor layer, wherein liquid crystal droplets are dispersed throughout the polymer layer; and a second conductor layer;

wherein the first and second conductor layers are electrically coupled to a voltage source; and wherein simultaneous application of voltage to the first and second conductor layers causes the liquid crystal droplets dispersed throughout the polymer layer to become aligned, which causes a corresponding variable transparency region to become more transparent.

5. The electronic device of claim 1, wherein a voltage is applied to the first variable transparency region upon determining that a user initiated an application program associated with the sensor.

6. An electronic device comprising:

a continuous display extending substantially evenly to all borders of a face of the electronic device and occupying at least ninety percent of an area of the face of the electronic device, a portion of said display comprising:

a light transmissive aperture through said display, wherein the light transmissive aperture is operable from transparent to opaque in response to a signal applied thereto;

a touch circuitry configured to generate signals responsive to a user interaction;

wherein the light transmissive aperture is arranged directly adjacent in a co-planar relationship only with the touch circuitry; and a sensor disposed directly beneath the light transmissive aperture, wherein the sensor is configured to receive light through said display via said light transmissive aperture.

7. The electronic device of claim 1, further comprising:

a portion of said display comprising a second light transmissive aperture through said display; and a light emitting device disposed directly beneath said second light transmissive aperture;

wherein light is transmitted by the light emitting device through said display via said second light transmissive aperture.

* * * * *